(12) United States Patent
Molesworth (10) Patent No.: US 10,927,922 B2
(45) Date of Patent: Feb. 23, 2021

(54) HYDRAULIC MOUNT

(71) Applicant: VIBRACOUSTIC NORTH AMERICA L.P., South Haven, MI (US)

(72) Inventor: Steven C. Molesworth, South Haven, MI (US)

(73) Assignee: Vibracoustic North America L.P., South Haven, MI (US)

( * ) Notice: Subject to any disclaimer, the term of this patent is extended or adjusted under 35 U.S.C. 154(b) by 0 days.

(21) Appl. No.: 16/207,561

(22) Filed: Dec. 3, 2018

(65) Prior Publication Data

US 2019/0170207 A1 Jun. 6, 2019

Related U.S. Application Data

(60) Provisional application No. 62/594,186, filed on Dec. 4, 2017.

(51) Int. Cl.
*F16F 13/16* (2006.01)
*F16F 13/14* (2006.01)

(52) U.S. Cl.
CPC ...... *F16F 13/1463* (2013.01); *F16F 13/1454* (2013.01)

(58) Field of Classification Search
CPC .. F16F 13/08; F16F 13/16; F16F 13/30; F16F 13/104; F16F 13/262
USPC ....... 267/140.13, 140.2–140.5, 141.1–141.7, 267/219
See application file for complete search history.

(56) References Cited

U.S. PATENT DOCUMENTS

| | | | |
|---|---|---|---|
| 4,277,056 A * | 7/1981 | Ticks | F16F 13/08 267/140.13 |
| 4,733,758 A * | 3/1988 | Duclos | F16F 13/30 188/267.1 |
| 4,909,490 A * | 3/1990 | de Fontenay | F16F 13/262 267/140.13 |
| 7,510,061 B2 * | 3/2009 | Bodie | F16F 13/105 188/267.2 |
| 7,798,477 B2 | 9/2010 | Rooke et al. | |
| 8,240,641 B2 * | 8/2012 | McGuire | B64D 27/26 267/33 |
| 9,097,310 B2 | 8/2015 | Gaspar et al. | |
| 9,441,704 B2 | 9/2016 | Gaspar et al. | |
| 9,784,310 B2 | 10/2017 | Schnaars et al. | |

(Continued)

FOREIGN PATENT DOCUMENTS

EP 2976545 B1 1/2016

*Primary Examiner* — Christopher P Schwartz
(74) *Attorney, Agent, or Firm* — Fishman Stewart PLLC (57) ABSTRACT

A hydraulic mount includes a first housing member, a second housing member connected to the first housing member, an inner tube disposed at least partially in the first housing member, an inner sleeve connected to the inner tube, an outer sleeve disposed at least partially around the inner sleeve, and a flexible member disposed at least partially in the first housing member and connected to the outer sleeve. The inner sleeve may include an outer surface and a fluid channel disposed in the outer surface. The flexible member may cooperate with at least one of the first housing member and the second housing member to provide a first fluid chamber and a second fluid chamber. The first fluid chamber and the second fluid chamber may be in fluid communication via the fluid channel.

20 Claims, 12 Drawing Sheets

(56) References Cited

U.S. PATENT DOCUMENTS

| | | |
|---|---|---|
| 9,976,620 B2 | 5/2018 | Rawlings et al. |
| 10,072,725 B2 | 9/2018 | Hattori |
| 2008/0197551 A1* | 8/2008 | Thibault ................. F16F 13/18 267/140.13 |
| 2016/0003322 A1* | 1/2016 | Bradshaw ............... F16F 13/16 267/140.13 |
| 2016/0195155 A1* | 7/2016 | Ludwig .................. F16F 13/28 267/140.13 |
| 2017/0363143 A1 | 12/2017 | Schnaars et al. |
| 2019/0078639 A1 | 3/2019 | Hattori |

* cited by examiner

HYDRAULIC MOUNT

CROSS-REFERENCE TO RELATED APPLICATION

This application claims the benefit of U.S. Provisional Patent Application Ser. No. 62/594,186, filed on Dec. 4, 2017, the disclosure of which is hereby incorporated herein by reference in its entirety.

TECHNICAL FIELD

The present disclosure generally relates to mounts and mounting devices, including hydraulic mounts that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some mount designs may not provide a desired amount of damping, may be relatively complex, and/or may be expensive to produce.

There is a desire for solutions/options that minimize or eliminate one or more challenges or shortcomings of mounts. The foregoing discussion is intended only to illustrate examples of the present field and should not be taken as a disavowal of scope.

SUMMARY

In embodiments, a hydraulic mount may include a first housing member, a second housing member connected to the first housing member, an inner tube disposed at least partially in the first housing member, an inner sleeve connected to the inner tube, an outer sleeve disposed at least partially around the inner sleeve, and/or a flexible member disposed at least partially in the first housing member and connected to the outer sleeve. An inner sleeve may include an outer surface and a fluid channel disposed in the outer surface. A flexible member may cooperate with at least one of the first housing member and the second housing member to provide a first fluid chamber and a second fluid chamber. A first fluid chamber and a second fluid chamber may be in fluid communication via the fluid channel.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

In embodiments, such as generally illustrated in FIGS. 1, 2A, 2B, and 3, a mount 20 may be configured to connect two or more components and may provide damping and/or may limit or restrict relative movement between the two or more components, such as a first component 22 and a second component 24. The first component 22 and the second component 24 may, for example and without limitation, include vehicle components. With embodiments, a mount 20 may include a first housing member 30, a second housing member 32 that may be connected to first housing member 30, and/or an inner assembly 34. The inner assembly 34 may be disposed at least partially in the first housing member 30 and/or at least partially in the second housing member 32. A mount 20 may be configured as a hydraulic mount and may include a fluid 26, such as a hydraulic fluid.

In embodiments, such as generally illustrated in FIGS. 1, 2A, 2B, 3, 4A, and 4B, a first housing member 30 may include a body 40 and one or more flanges (e.g., flanges 42A, 42B) that may extend from the body 40. The body 40 may include one or more of a variety of shapes, sizes, configurations, and/or materials. For example and without limitation, the body 40 may include a generally cylindrical configuration that may include a first opening 44 at a first axial end 46 and/or a second opening 48 at a second axial end 50. A first flange 42A and/or a second flange 42B may extend radially outward from the first axial end 46. The first flange 42A and the second flange 42B may be disposed opposite each other (e.g., about 180 degrees apart). The first flange 42A may include a first aperture 52A, and/or the second flange 42B may include a second aperture 52B. The first aperture 52A and/or the second aperture 52B may be configured to at least partially receive a respective fastener 54A, 54B, such as a bolt or rivet, that may connect the first housing member 30 to the second housing member 32 and/or to a first component 22.

With embodiments, such as generally illustrated in FIGS. 1, 2A, 2B, 3, 5, 5A, and 5B, a second housing member 32 may include a first portion 60 and a second portion 62. The second housing member 32 may additionally/optionally include a third portion 64. The first portion 60 and/or the second portion 62 may include, for example and without limitation, annular and/or disc-like configurations. The first portion 60 may include an aperture 66 that may be configured to at least partially receive a fastener 68 that may be configured to connect the first housing member 30 with a second component 24 and/or with an inner tube 80 of inner assembly 34. The second portion 62 may include one or more flanges, such as a first flange 70A and/or a second flange 70B. The first flange 70A and the second flange 70B may extend in opposite directions. In embodiments, the first flange 70A and the second flange 70B of the second housing member 32 may be configured for alignment and/or connection with the first flange 42A and the second flange 42B, respectively, of the first housing member 30. The first flange 70A of the second housing member 32 may include a first aperture 72A that may be aligned with the first aperture 52A of the first flange 42A of the first housing member 30. The second flange 70B of second housing member 32 may include a second aperture 72B that may be aligned with the second aperture 52B of the second flange 42B of the first housing member 30. A first fastener 54A may extend through the first aperture 52A and the first aperture 72A, and/or a second fastener 54B may extend through the second aperture 52B and the second aperture 72B, such as to connect the first housing member 30 and the second housing member 32 to a first component 22.

Figure 1:
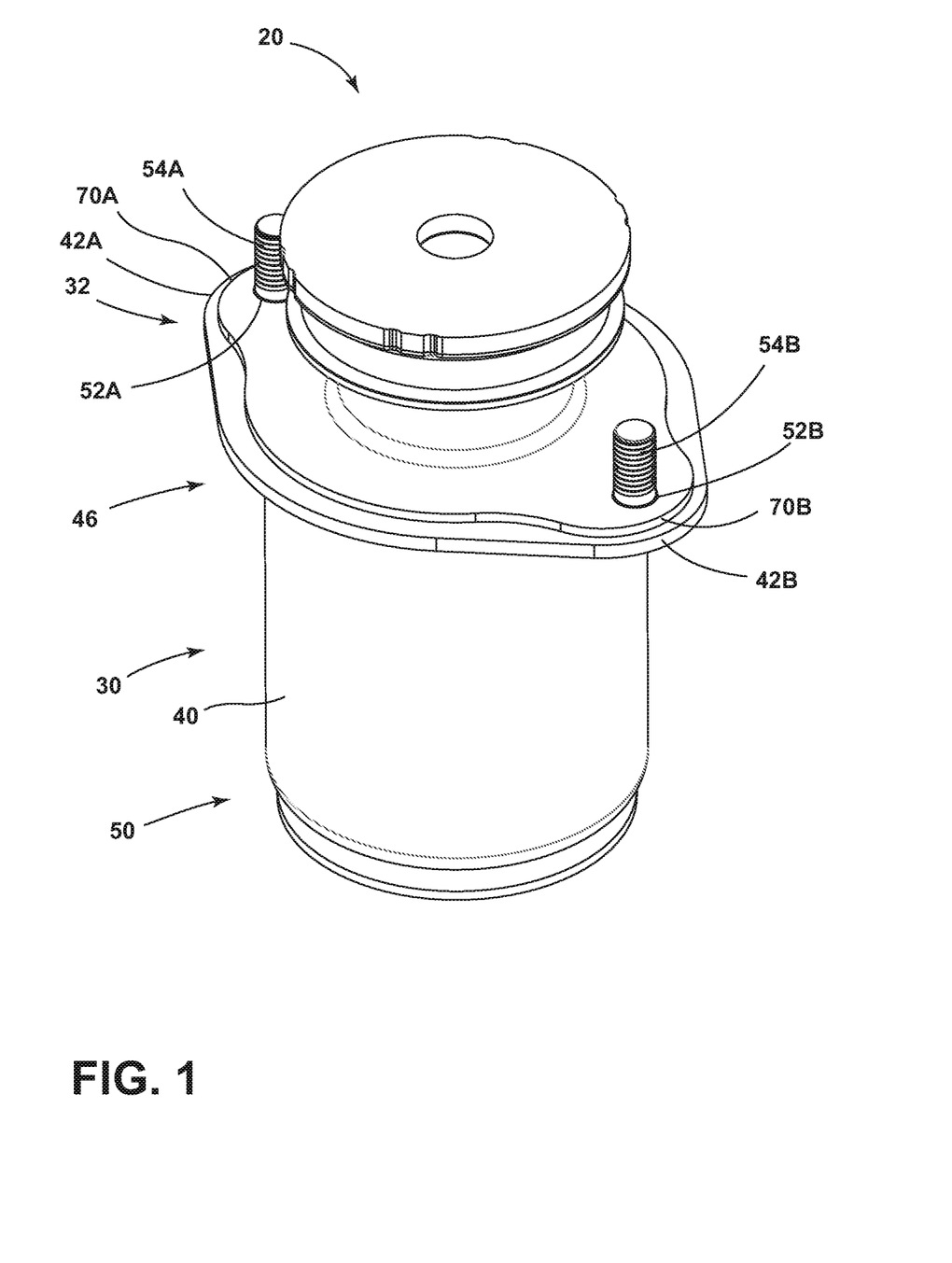
FIG. 1 is a perspective view generally illustrating an embodiment of a hydraulic mount according to teachings of the present disclosure.
Figure 2A:
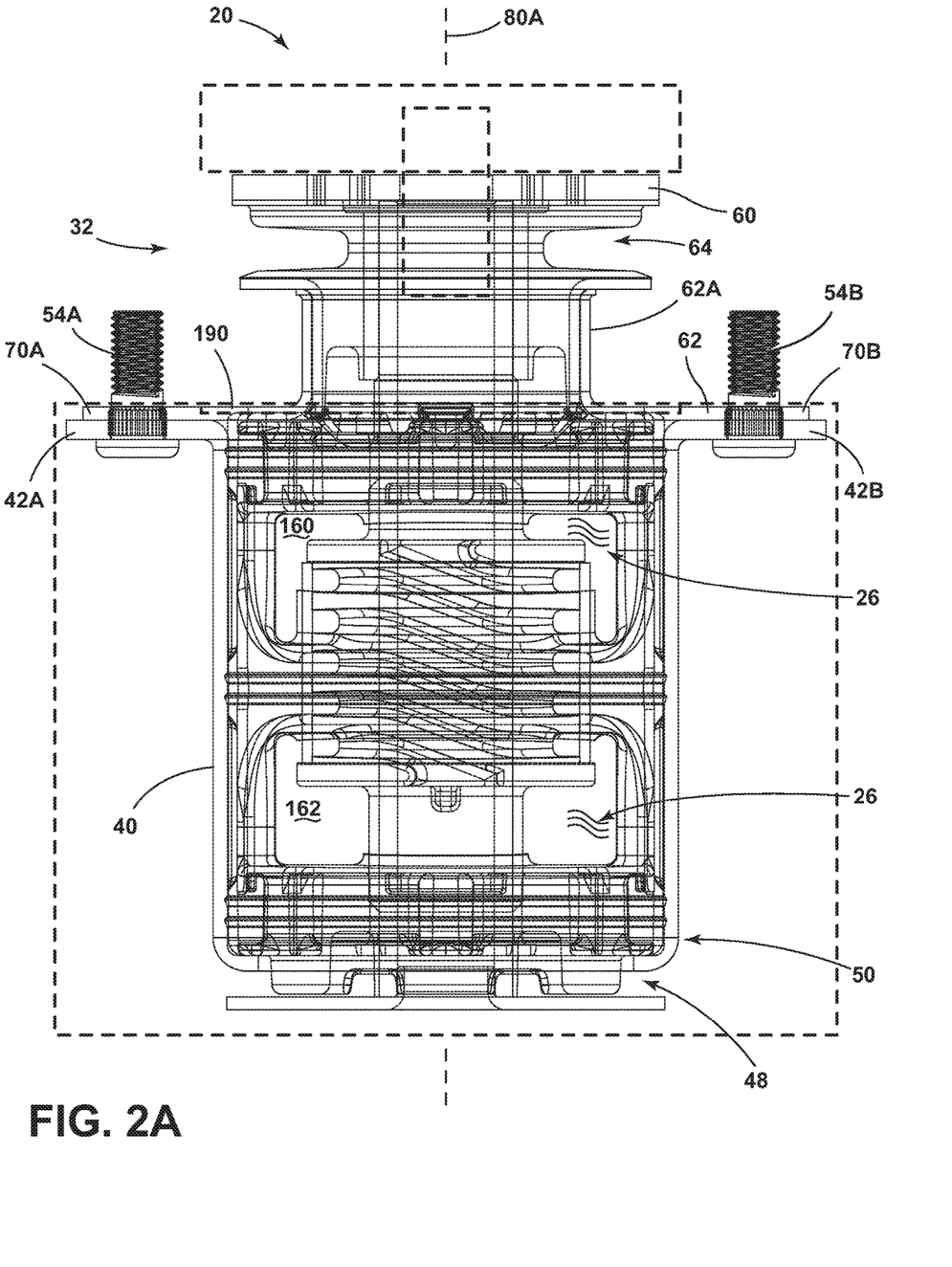
FIG. 2A is a front view generally illustrating an embodiment of a hydraulic mount, with some portions shown as transparent, according to teachings of the present disclosure.
Figure 2B:
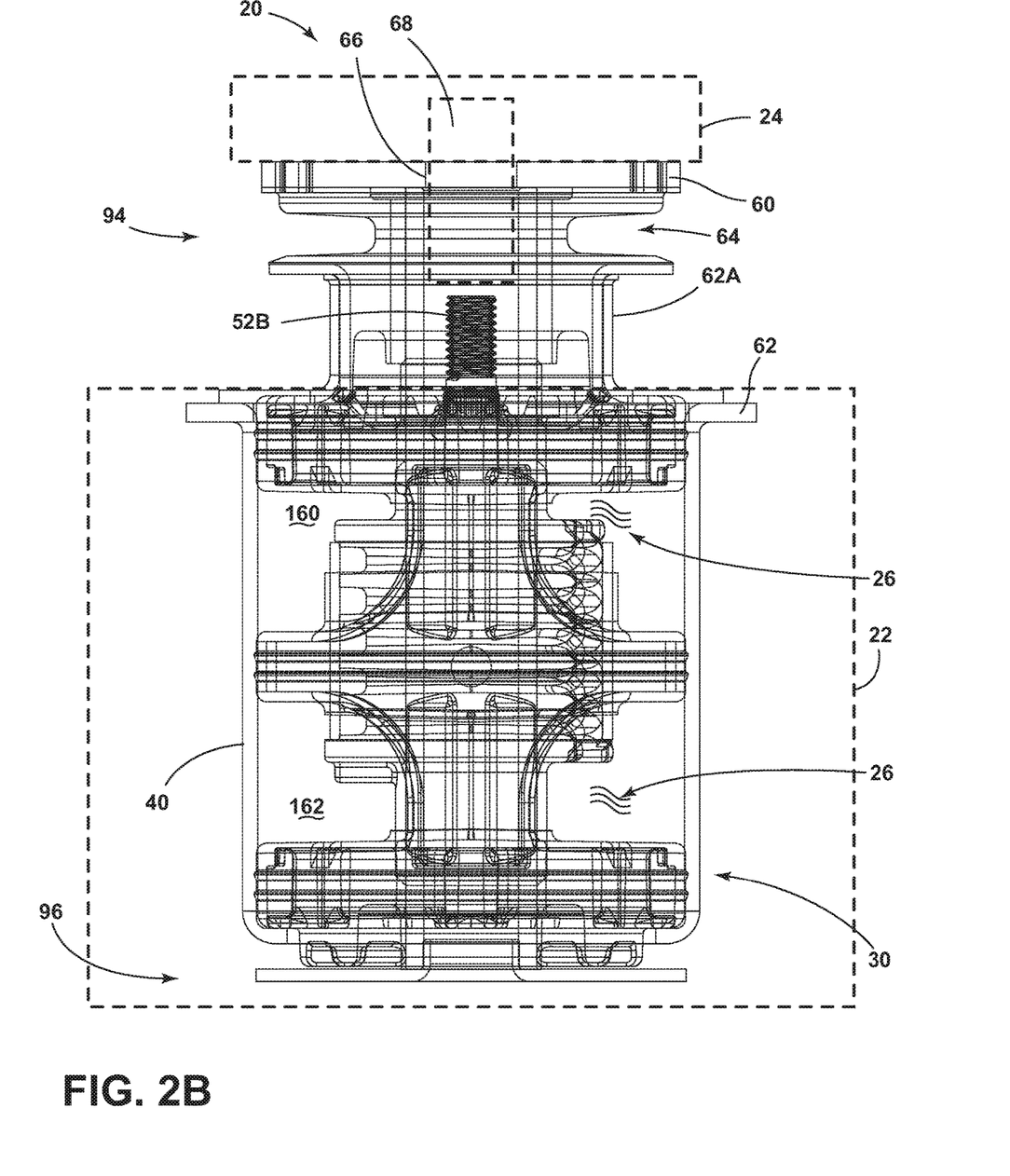
FIG. 2B is a side view generally illustrating an embodiment of a hydraulic mount, with some portions shown as transparent, according to teachings of the present disclosure.
Figure 3:
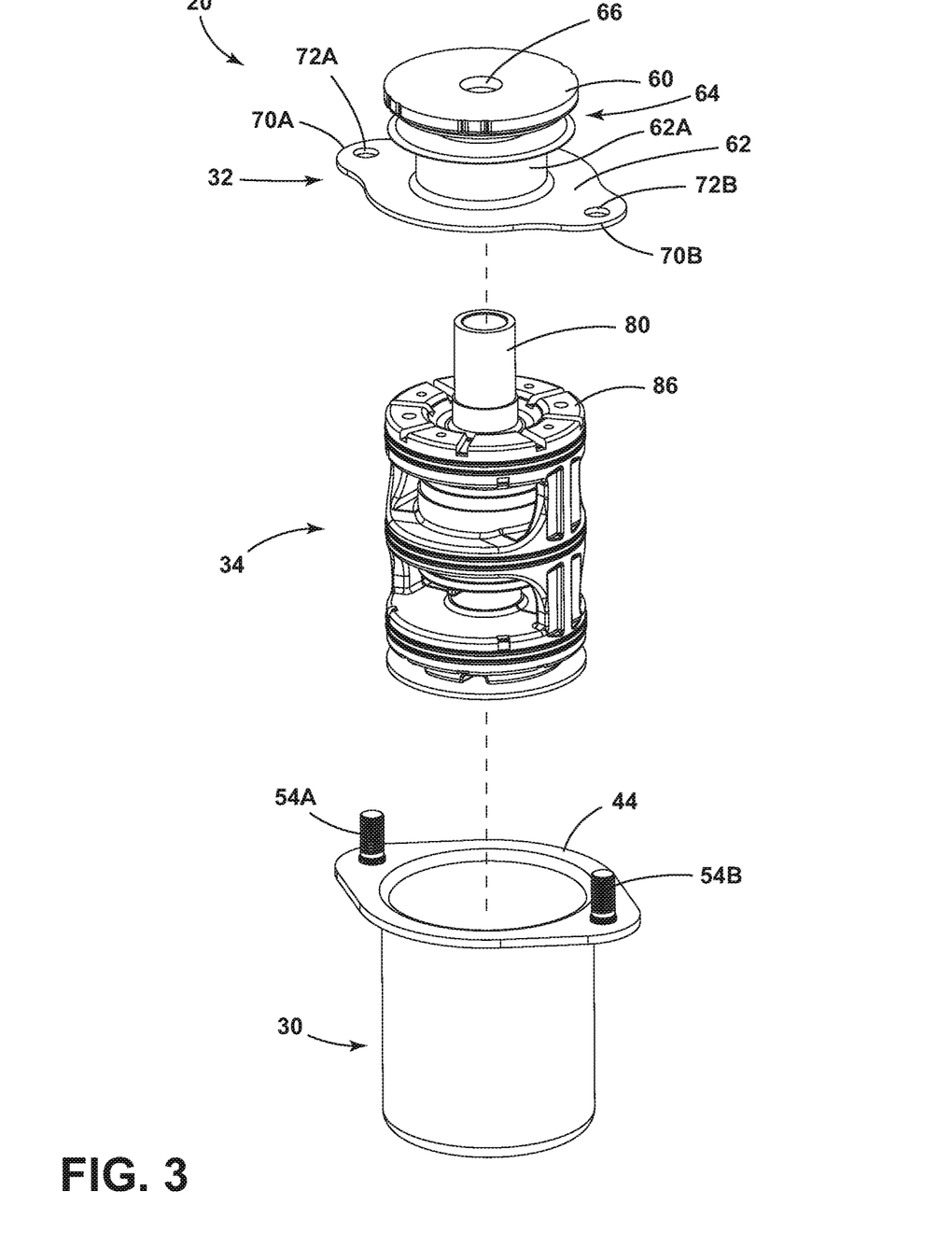
FIG. 3 is an exploded perspective view generally illustrating an embodiment of a hydraulic mount according to teachings of the present disclosure.
Figures 4A, 4B:
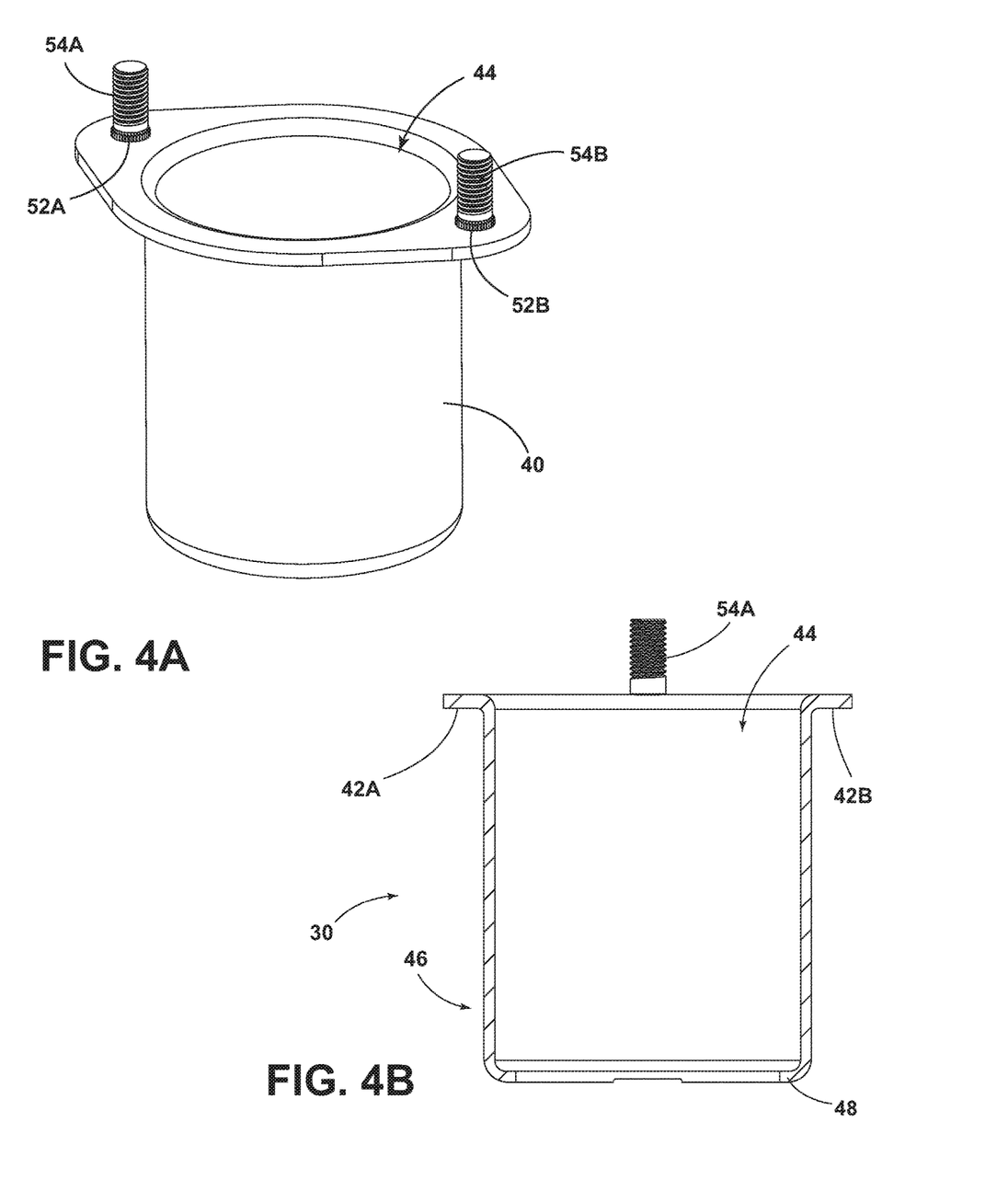
FIG. 4A is a perspective view generally illustrating an embodiment of a first housing member according to teachings of the present disclosure.
FIG. 4B is a cross-sectional view generally illustrating an embodiment of a first housing member according to teachings of the present disclosure.
Figure 5:
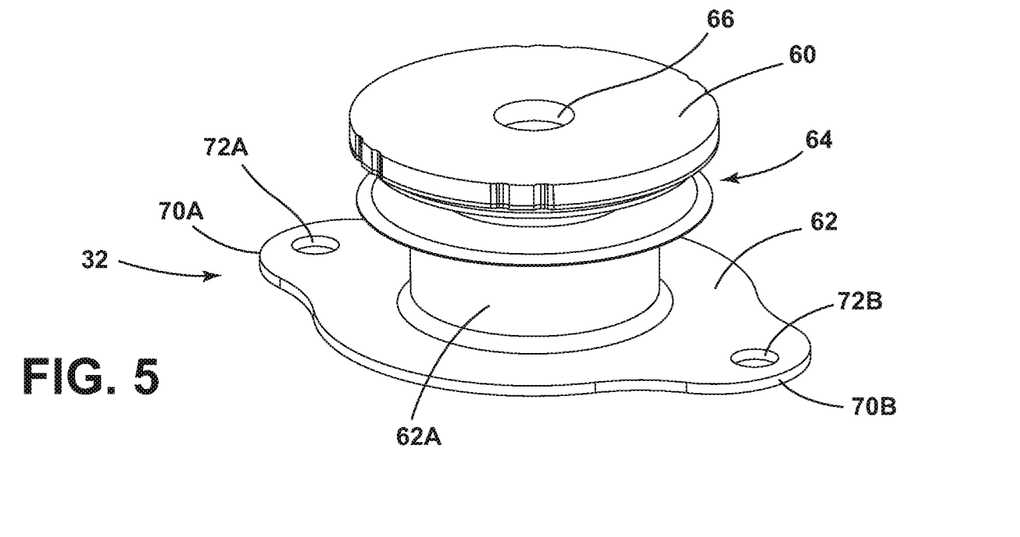
FIGS. 5, 5A, and 5B are perspective views generally illustrating portions of embodiments of second housing members according to teachings of the present disclosure.
Figure 5A:
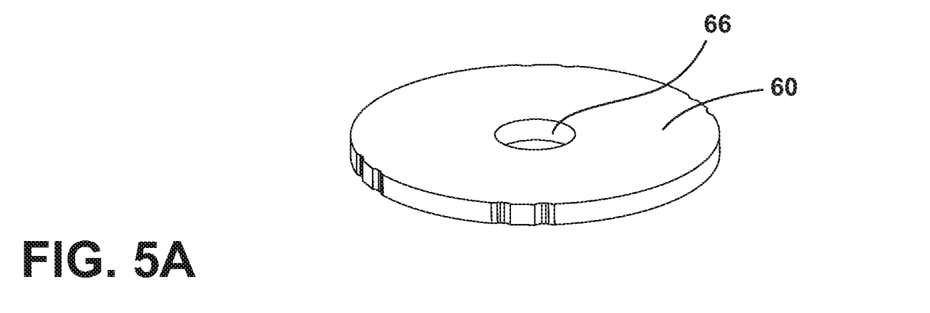
Figure 5B:
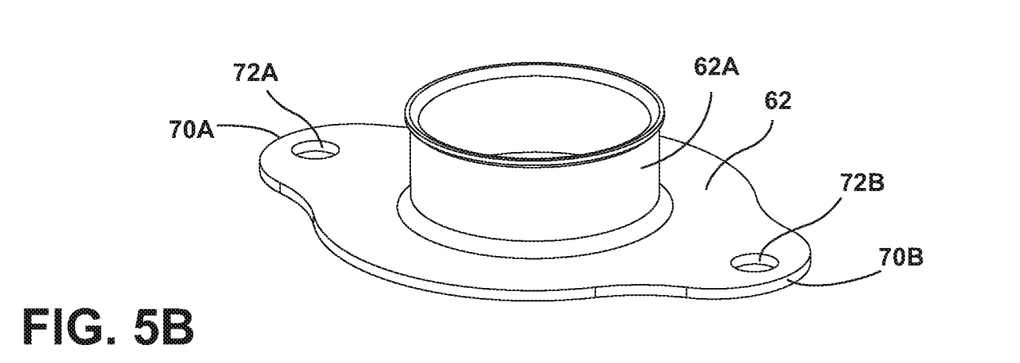

In embodiments, a third portion 64 of the second housing member 32 may be provided and may connect the first portion 60 with the second portion 62. If included, a third portion 64 may include a resilient material that may be configured to flex and/or deflect upon receiving forces, such axial forces that may be applied via the first portion 60 (e.g., from a first component 22) and/or via the second portion 62 (e.g., via a second component 24). The second housing member 32 may include a cushion and/or may be configured as a cushion. The third portion 64 may be connected to the first portion 60 and/or to the second portion 62, such as to an extension 62A of the second portion 62. The extension 62A may, for example and without limitation, include a generally cylindrical configuration.

With embodiments, such as generally illustrated in FIGS. 3, 6A, 6B, 6C, 7, 8, 8A, 8B, 9, 10A, and 10B, an inner assembly 34 may include an inner tube 80, an inner sleeve 82, an outer sleeve 84, a flexible member 86, a first support member 88, a second support member 90, and/or a third support member 92. The inner tube 80 may include a generally cylindrical configuration and, in an assembled configuration, may extend from a first end 94 of the mount 20 to a second end 96 of the mount 20. The inner tube 80 may include a raised portion 98 that may include a greater diameter than other portions and/or the remainder of the inner tube 80. The raised portion 98 may, for example and without limitation, be configured to engage inner sleeve 82.

Figure 6A:
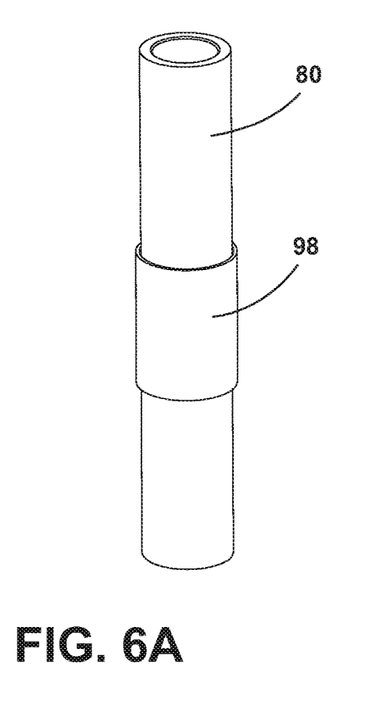
FIG. 6A is a perspective view generally illustrating an embodiment of an inner tube according to teachings of the present disclosure.
Figure 6B:
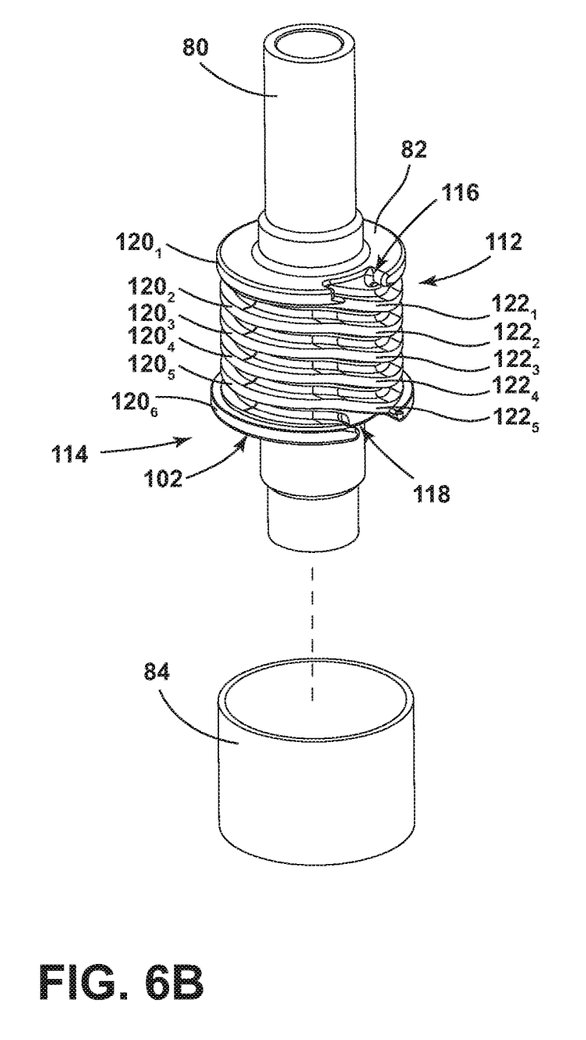
FIG. 6B is an exploded perspective view generally illustrating portions of an embodiment of an inner assembly, including an inner tube, an inner sleeve, and an outer sleeve, according to teachings of the present disclosure.

In embodiments, such as generally illustrated in FIG. 6B, an inner sleeve 82 may be connected to an inner tube 80. For example and without limitation, the inner sleeve 82 may be configured to at least partially receive the inner tube 80. An inner surface 100 of the inner sleeve 82 may engage the raised portion 98 of the inner tube 80 to restrict and/or prevent relative axial movement between the inner sleeve 82 and the inner tube 80. An inner sleeve 82 may include a fluid channel 110 (e.g., path, recess, slot, etc.) that may be provided by or formed in or about an outer surface 102 of the inner sleeve 82. The fluid channel 110 may provide fluid communication between a first axial end 112 of the inner sleeve 82 and a second, opposite axial end 114 of the inner sleeve 82. The fluid channel 110 may extend around the inner sleeve 82 one or more times. For example and without limitation, the fluid channel 110 may extend around the inner sleeve 82 about five times. The fluid channel 110 may include a first fluid port 116 and a second fluid port 118. The inner sleeve 82 may include a plurality of radially-extending ribs that may define portions of the fluid channel 110. The ribs may include one or more planar or axial ribs 120 (e.g., ribs 1201, 1202, 1203, 1204, 1205, 1206) that be disposed substantially perpendicularly to an axis 80A of the inner tube 80 and/or may include one or more angular ribs or rib portions 122 (e.g., ribs 1221, 1222, 1223, 1224, 1225). The angular ribs or rib portions 122 may connect adjacent planar ribs 120 together. The combination of planar or axial ribs 120 and angular ribs or rib portions 122 may provide a somewhat "spiral" configuration/effect. For example and without limitation, in an embodiment the inner sleeve 82 may include six planar ribs 120 and five angular ribs 122 that may connect planar ribs 120 together, which may form a continuous fluid channel 110 between the first fluid port 116 and the second fluid port 118. Some or all of the planar or axial ribs 120 may be aligned (e.g., circumferentially) with each other. Some or all of the angular ribs 122 may be aligned (e.g., circumferentially) with each other. The first fluid port 116 and/or the second fluid port 118 may be aligned (e.g., circumferentially) with the angular ribs 122. A first end rib (e.g., rib 1201) and/or a second end rib (e.g., rib 1206) of the inner sleeve 82 may include diameters that are greater than an outer diameter of a remainder of the inner sleeve 82 (e.g., greater than diameters of the ribs 1202, 1203, 1204, 1205) and/or greater than an inner diameter of the outer sleeve 84.

Figure 6C:
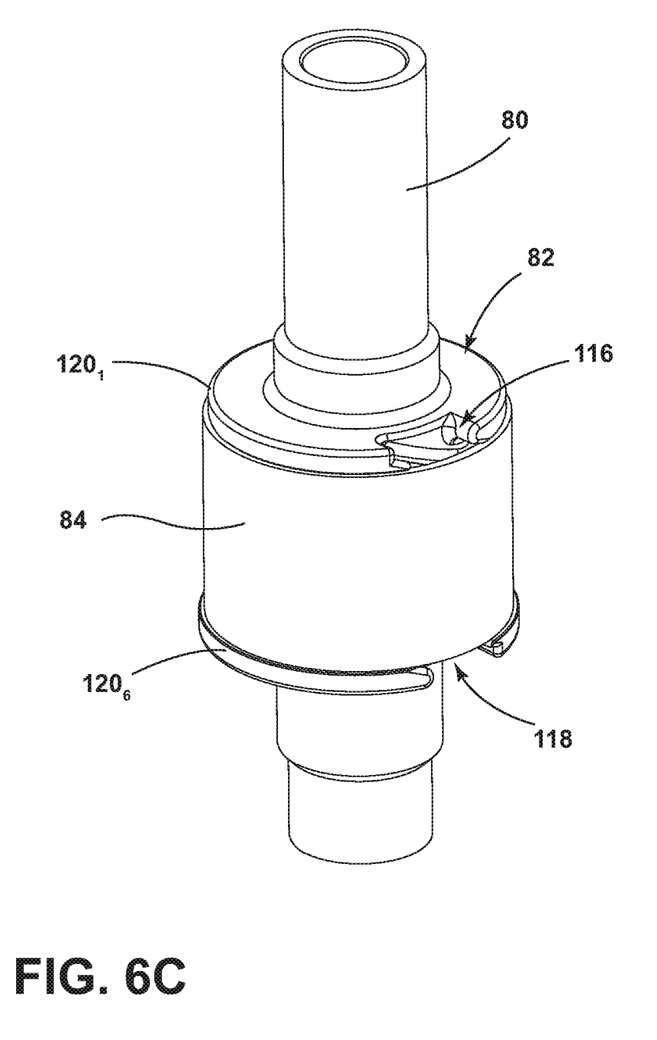
FIG. 6C is a perspective view generally illustrating portions of an embodiment of an inner assembly, including an inner tube, an inner sleeve, and an outer sleeve, according to teachings of the present disclosure.
Figure 7:
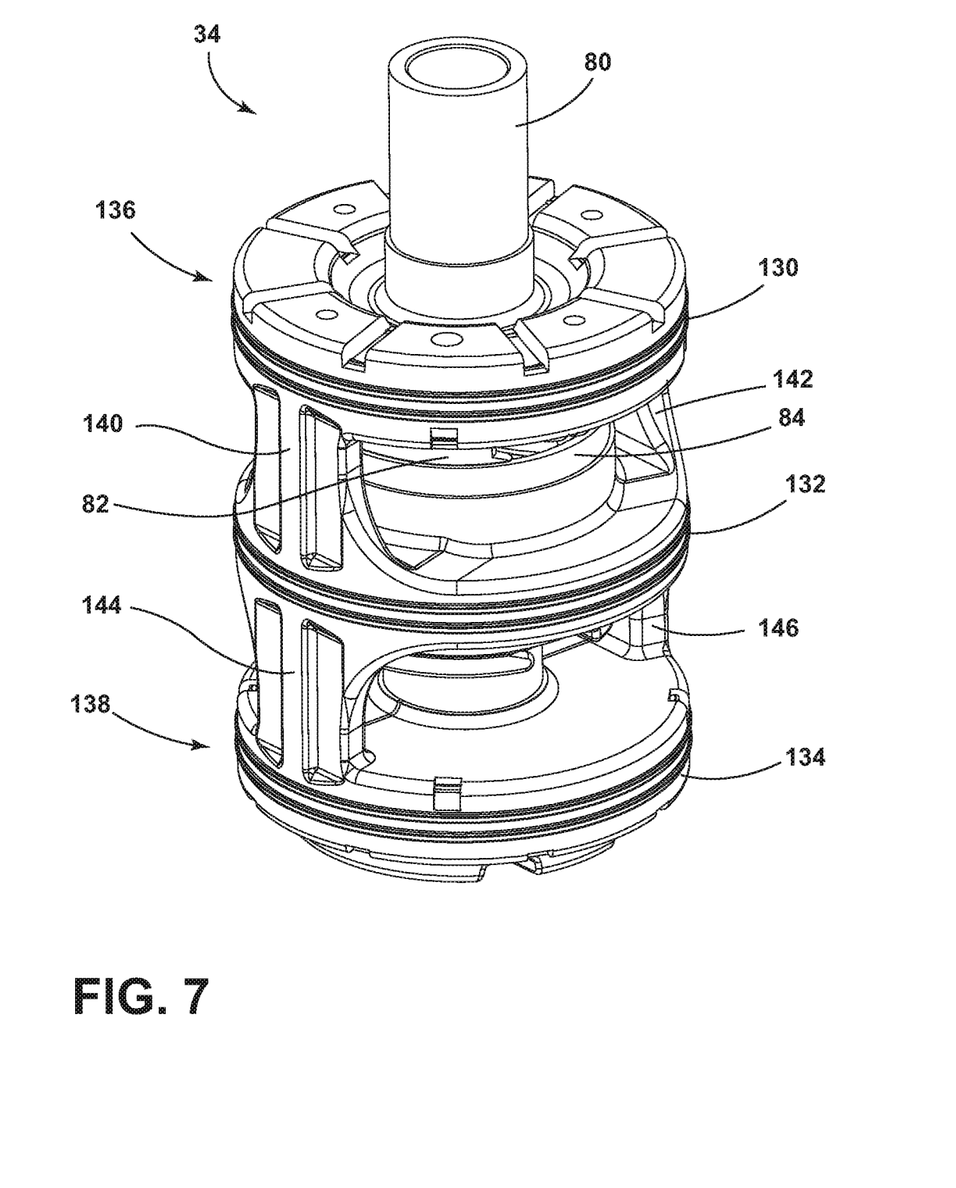
FIG. 7 is a perspective view generally illustrating portions of an embodiment of an inner assembly, including an inner tube, an inner sleeve, an outer sleeve, and a flexible member, according to teachings of the present disclosure.
Figure 8:
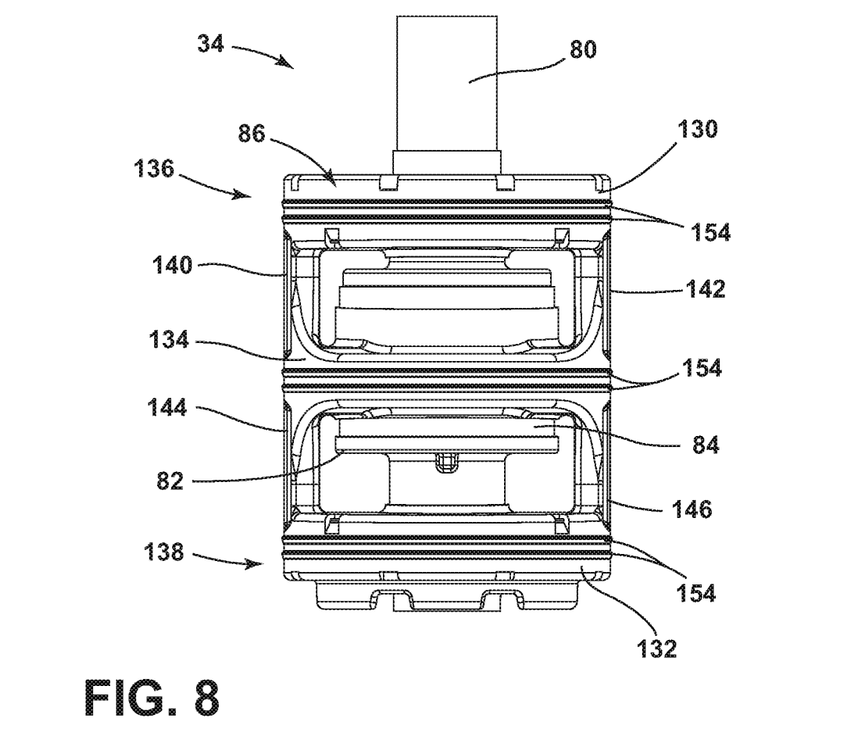
FIG. 8 is a front view generally illustrating portions of an embodiment of an inner assembly, including an inner tube, an inner sleeve, an outer sleeve, and a flexible member, according to teachings of the present disclosure.
Figure 8A:
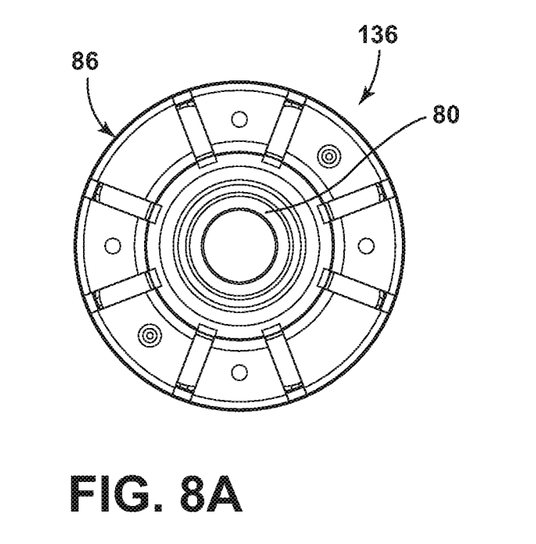
FIG. 8A is a top view generally illustrating portions of an embodiment of an inner assembly, including an inner tube and a flexible member, according to teachings of the present disclosure.
Figure 8B:
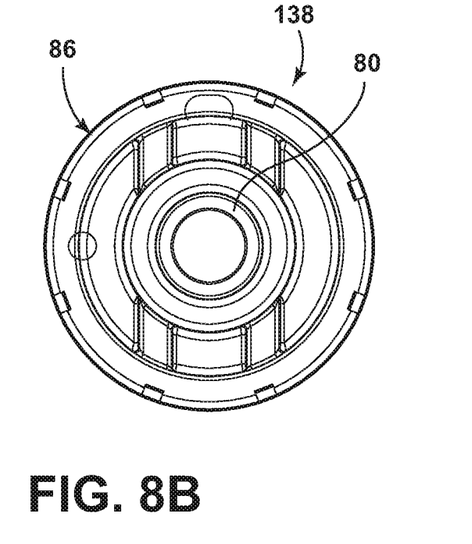
FIG. 8B is a bottom view generally illustrating portions of an embodiment of an inner assembly, including an inner tube and a flexible member, according to teachings of the present disclosure.

With embodiments, such as generally illustrated in FIG. 6C, an outer sleeve 84 may be configured to at least partially receive and/or engage the inner sleeve 82. The outer sleeve 84 may include a cylindrical configuration and may include an inner diameter (e.g., a minimum diameter) that may be smaller than outer diameters of the first end rib 1201 and/or the second end rib 1206, and/or that is substantially the same or smaller than an outer diameter of a remainder of the inner sleeve 82. The outer sleeve 84 and the inner sleeve 82 may be disposed in a fluid sealing configuration in which the outer sleeve 84 engages with planar ribs 120 and/or angular ribs 122 to prevent fluid communication across/outside of the planar ribs 120 or the angular ribs 122. For example and without limitation, the inner sleeve 82 and the outer sleeve 84 may be connected such that fluid 26 may only flow from the first fluid port 116 to the second fluid port 118 by flowing through all of fluid channel 110 and/or may only flow from the second fluid port 118 to first fluid port 116 by flowing through all of fluid channel 110. In embodiments, the inner sleeve 82 and outer sleeve 84 may be swaged together and/or may be disposed coaxially with each other.

With embodiments, such as generally illustrated in FIGS. 3, 7, 8, 8A, 8B, 10A, and 10B, a mount 20 may include a flexible member 86 that may be included with the inner assembly 34. A flexible member 86 may include one or more of a variety of shapes, sizes, configurations, and/or materials. For example and without limitation, a flexible member 86 may include a resilient material, such as an elastomer, and/or may include a generally cylindrical configuration. The flexible member 86 may include a first portion 130, a second portion 132, and/or a third portion 134. The first portion 130 may be disposed at or about a first end 136 of the flexible member 86, the second portion 132 may be disposed at or about a second end 138 of the flexible member 86, and/or the third portion 134 may be disposed at least partially between (e.g., axially) the first portion 130 and the second portion 132. The first portion 130 may be connected with the third portion 134 via a first connecting portion 140 and/or a second connecting portion 142. The first connecting portion 140 and the second connecting portion 142 may extend substantially in an axial direction and/or may be disposed at or about opposite sides of the flexible member 86. The second portion 132 may be connected with the third portion 134 via a third connecting portion 144 and/or a fourth connecting portion 146. The third connecting portion 144 and the fourth connecting portion 146 may extend substantially in an axial direction and/or may be disposed at or about opposite sides of flexible member 86. The first portion 130 may be disposed in direct contact and/or in a sealing engagement with the first housing member 30 and the inner tube 80 (e.g., proximate a first end 150 of inner tube 80). The second portion 132 may be disposed in direct contact and/or in a sealing engagement with the first housing member 30 and the inner tube 80 (e.g., proximate a second end 152 of inner tube 80). The third portion 134 may be disposed in a sealing engagement with the first housing member 30 and the outer sleeve 84. The first portion 130, the second portion 132, and/or the third portion 134 may include one or more radially-extending ribs 154 (e.g., sealing ribs) that may engage the first housing member 30. With embodiments, the flexible member 86 may or may not contact the inner sleeve 82.

In embodiments, a flexible member 86 may be configured to be inserted at least partially into the first housing member 30. The flexible member 86 may cooperate with the first housing member 30, the inner tube 80, and/or the outer sleeve 84 to provide a first fluid chamber 160 and/or a second fluid chamber 162 (see, e.g., FIGS. 2A and 2B). For example and without limitation, the first portion 130, the third portion 134, the first housing member 30, the outer sleeve 84, and/or the inner tube 80 may cooperate to provide a first chamber 160. The second portion 132, the third portion 134, first housing member 30, the outer sleeve 84, and the inner tube 80 may cooperate to provide a second fluid chamber 162. The first fluid chamber 160 may be in fluid communication with the second fluid chamber 162 via the fluid channel 110 of the inner sleeve 82. With embodiments, the first fluid chamber 160 may be in fluid communication with the second fluid chamber 162 only via the fluid channel 110 of the inner sleeve 82. A fluid 26 may be disposed in the first chamber 160, the second chamber 162, and/or the fluid channel 110. The first chamber 160, the second chamber 162, and/or the fluid channel 110 may be partially or entirely full of fluid 26. The first chamber 160 and the second chamber 162 may be substantially the same size or may be of different sizes. For example and without limitation, the second chamber 162 may include a volume that is at least about 25% larger than a volume of the first chamber 160.

Figure 9:
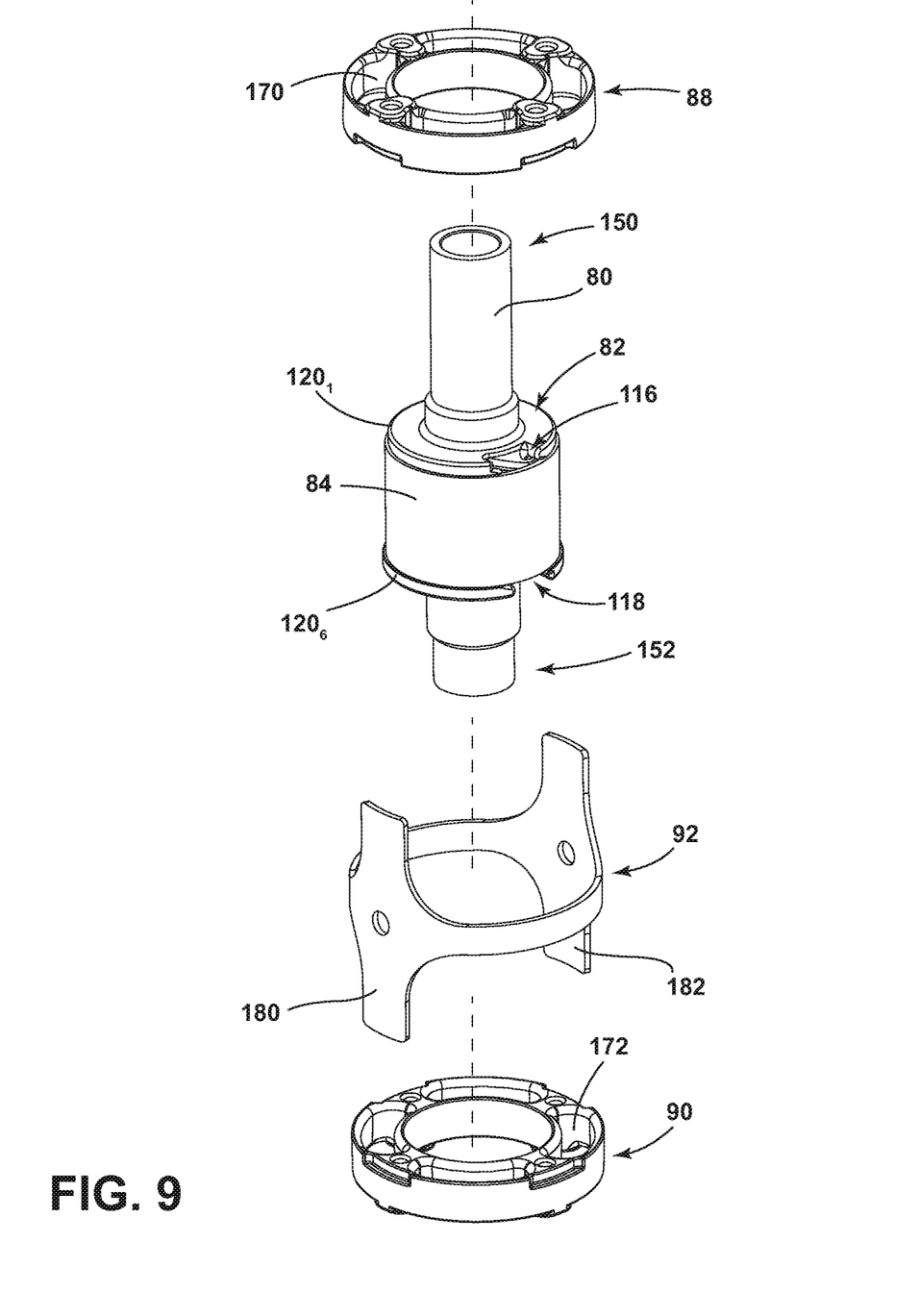
FIG. 9 is an exploded perspective view generally illustrating portions of an embodiment of an inner assembly, including an inner tube, an inner sleeve, an outer sleeve, a first support member, a second support member, and a third support member, according to teachings of the present disclosure.
Figures 10A, 10B:
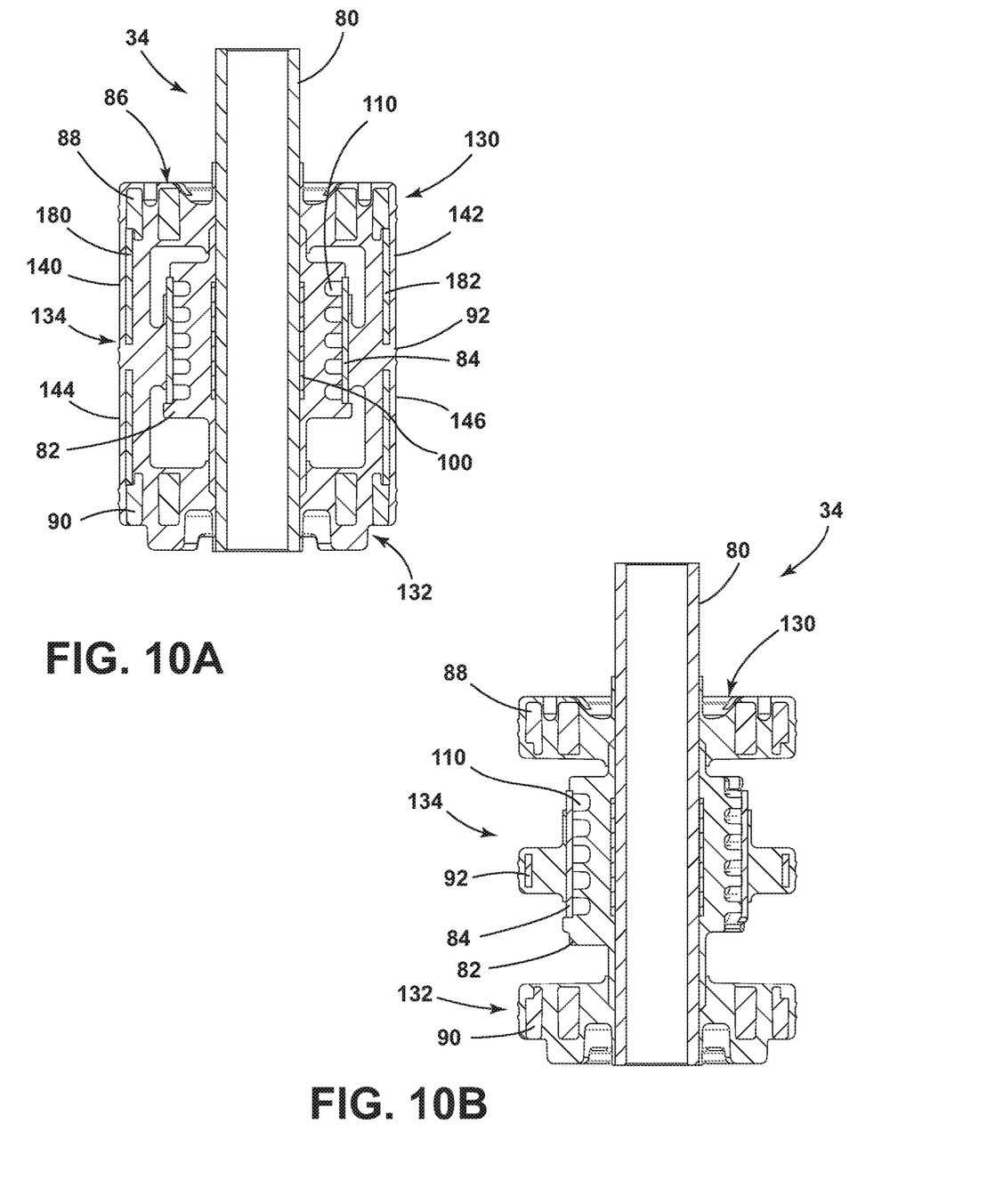
FIG. 10A is a front cross-sectional view generally illustrating portions of an embodiment of an inner assembly, including an inner tube, an inner sleeve, an outer sleeve, and a flexible member, according to teachings of the present disclosure.
FIG. 10B is a side cross-sectional view generally illustrating portions of an embodiment of an inner assembly, including an inner tube, an inner sleeve, an outer sleeve, and a flexible member, according to teachings of the present disclosure.

With embodiments, such as generally illustrated in FIGS. 9, 10A, and 10B, a mount 20 may include a first support member 88, a second support member 90, and/or a third support member 92, which may be included in an inner assembly 34. The first support member 88 may include a generally circular or cylindrical configuration and may be connected with the first portion 130 of the flexible member 86. For example and without limitation, the first support member 88 may be disposed partially or entirely within the first portion 130 of the flexible member 86 (e.g., the first portion 130 may be formed around the first support member 88). The first support member 88 may include one or more circumferentially extending slots or recesses 170. The second support member 90 may include a generally circular or cylindrical configuration and may be connected with the second portion 132 of the flexible member 86. For example and without limitation, the second support member 90 may be disposed partially or entirely within the second portion 132 of the flexible member 86 (e.g., the second portion 132 may be formed around the second support member 90). The second support member 90 may include one or more circumferentially extending slots or recesses 172. The first support member 88 and the second support member 90 may include a substantially and/or entirely common configuration. The third support member 92 may include a generally cylindrical and/or H-shaped configuration and may be connected with the third portion 134 of the flexible member 86. For example and without limitation, the third support member 92 may be disposed partially or entirely within the third portion 134 of the flexible member 86 (e.g., the third portion 134 may be formed around the third support member 92). The third support member 92 may include a generally H-shaped configuration, such as if viewed from the front or rear. For example and without limitation, the third support member 92 may include a first axially-extending portion 180 and/or a second axially-extending portion 182 that may be disposed opposite (e.g., about 180 degrees from) the first axially-extending portion 180. The first axially-extending portion 180 may extend into the first connecting portion 140 and/or the third connecting portion 144 of the flexible member 86. The second axially-extending portion 182 may extend into the second connecting portion 142 and/or the fourth connecting portion 146 of the flexible member 86.

In embodiments, a flexible member 86 may be a single, unitary, monolithic component. For example and without limitation, a flexible member 86 may be formed as a single, unitary component about or around the inner tube 80, the outer sleeve 84, the first support member 88, the second support member 90, and/or the third support member 92.

With embodiments, a mount 20 may be configured for under-perch mounting. For example and without limitation, a maximum diameter of the first portion 60 of the second housing member 32 may be less than a maximum diameter or width of the first housing member 30, which may be at or about flanges 42A, 42B. Such a configuration may permit the first portion 60 to be inserted through a mounting hole 190 in first component 22, toward the second component 24. With under-perch mounting, the flanges 42A, 42B of the first housing member 30 and the flanges 70A, 70B of second housing member 32 may be disposed below a top surface of the first component 22.

In embodiments, a mount 20 may be configured to restrict and/or dampen relative movement between a first component 22 and a second component 24. A first component 22 may be connected to the first housing member 30 and/or the second portion 62 of the second housing member 32. A second component 24 may be connected to a first portion 60 of the second housing member 32 and/or the inner tube 80. If the first component 22 and/or the second component 24 move relative to the other, a force may be applied to the inner tube 80 and/or the flexible member 86 to cause relative movement between the inner tube 80 and the flexible member 86. The fluid 26, which may be disposed in the first chamber 160 and/or the second chamber 162, may restrict relative movement between the inner tube 80 and flexible member 86. For example and without limitation, relative movement between the inner tube 80 and the flexible member 86 may involve changing a volume of the first chamber 160 and/or the second chamber 162. Additionally, in embodiments, relative movement between the inner tube 80, first support member 88, second support member 90, and third support member 92 may involve changing a volume of the first chamber 160 and/or the second chamber 162, such as, without limitation, via deformation of the connecting flexible member 86. Fluid 26 in the first chamber 160 and/or the second chamber 162 may be incompressible or substantially incompressible, so a change in volume of the first chamber 160 or the second chamber 162 may require fluid 26 to move from the compressed chamber to the expanded chamber. In embodiments, fluid 26 may move between the first chamber 160 to the second chamber 162 only via the fluid channel 110, and the fluid channel 110 may provide at least some resistance to fluid flow, which may restrict and/or dampen relative movement of the inner tube 80 and/or second component 24 relative to flexible member 86 and/or first component 22. The configuration of the fluid channel 110 may be modified to modify the damping properties of the mount.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A hydraulic mount, comprising:
a first housing member;

a second housing member connected to the first housing member;

an inner tube disposed at least partially in the first housing member;

an inner sleeve connected to the inner tube, the inner sleeve including an outer surface and a fluid channel provided with or by the outer surface;

an outer sleeve disposed at least partially around the inner sleeve; and a flexible member disposed at least partially in the first housing member and connected to the outer sleeve;

wherein the flexible member cooperates with at least one of the first housing member and the second housing member to provide a first fluid chamber and a second fluid chamber; the flexible member is a monolithic component; and the first fluid chamber and the second fluid chamber are in fluid communication via the fluid channel.

2. The hydraulic mount of claim 1, including a first support member, wherein the flexible member is formed around the first support member.

3. The hydraulic mount of claim 2, including a second support member, wherein the flexible member is formed around the second support member.

4. The hydraulic mount of claim 3, including a third support member, wherein the flexible member is formed around the third support member, and the third support member is disposed at least partially between the first support member and the second support member in an axial direction.

5. The hydraulic mount of claim 1, wherein the inner sleeve includes a plurality of ribs that cooperate to provide the fluid channel.

6. The hydraulic mount of claim 5, wherein the plurality of ribs includes a plurality of planar ribs and a plurality of angular ribs that connect adjacent planar ribs.

7. The hydraulic mount of claim 5, wherein at least one rib of the plurality of ribs includes a greater diameter than another rib of the plurality of ribs.

8. The hydraulic mount of claim 5, wherein a first end rib and a second end rib of the plurality of ribs include greater diameters than an inner diameter of the outer sleeve.

9. The hydraulic mount of claim 1, wherein the flexible member includes a first portion, a second portion, and a third portion; and the first portion, the third portion, the first housing member, the outer sleeve, and the inner tube cooperate to provide the first fluid chamber.

10. The hydraulic mount of claim 9, wherein the third portion, the first housing member, the outer sleeve, and the inner tube cooperate to provide the second fluid chamber.

11. The hydraulic mount of claim 1, wherein the outer sleeve is in direct contact with the inner sleeve; and the flexible member is formed around the outer sleeve, a first support member, a second support member, a third support member, and the inner tube.

12. The hydraulic mount of claim 1, wherein the first fluid chamber and the second fluid chamber are different sizes.

13. The hydraulic mount of claim 1, wherein the first fluid chamber and the second fluid chamber are in fluid communication only via the fluid channel.

14. The hydraulic mount of claim 1, wherein a maximum diameter of at least a portion of the inner sleeve is greater than a minimum diameter of the outer sleeve.

15. The hydraulic mount of claim 1, wherein the outer sleeve is swaged with the inner sleeve.

16. The hydraulic mount of claim 1, wherein the flexible member includes a first portion in contact with the inner tube and a second portion in contact with the inner tube.

17. The hydraulic mount of claim 1, wherein the inner sleeve is connected directly to the inner tube.

18. The hydraulic mount of claim 1, wherein the flexible member includes one or more sealing ribs configured to provide a fluid seal between the flexible member and the first housing member.

19. The hydraulic mount of claim 1, wherein the first housing member and the second housing member are configured for an under-perch mounting configuration.

20. A hydraulic mount, comprising:
a first housing member;
a second housing member connected to the first housing member;
an inner tube disposed at least partially in the first housing member;
an inner sleeve connected to the inner tube, the inner sleeve including an outer surface and a fluid channel provided with or by the outer surface;
an outer sleeve disposed at least partially around the inner sleeve; and
a flexible member disposed at least partially in the first housing member and connected to the outer sleeve;
wherein the flexible member cooperates with at least one of the first housing member and the second housing member to provide a first fluid chamber and a second fluid chamber, and the first fluid chamber and the second fluid chamber are in fluid communication via the fluid channel; wherein the flexible member is a monolithic component; including a first support member, wherein the flexible member is formed around the first support member; including a second support member, wherein the flexible member is formed around the second support member; and wherein the first support member and the second support member have a substantially common configuration.

* * * * *